US012632900B2

(12) United States Patent (10) Patent No.: US 12,632,900 B2
Mercurio et al. (45) Date of Patent: May 19, 2026

(54) SYSTEMS AND METHODS FOR CONTINUOUSLY UPDATING AND RUNTIME PROCESSING OF DECISIONING

(71) Applicant: JPMORGAN CHASE BANK, N.A., New York, NY (US)

(72) Inventors: Aaron Mercurio, Pleasantville, NY (US); Rasik Goyal, Newark, DE (US); Selva Dharmara, Wilmington, DE (US); Nikunj Tanna, Newark, DE (US); Sameer Avate, Little Elm, TX (US); Hemant D Patil, Plano, TX (US); Gayatri Prabhu, Keller, TX (US); Vidyasankar Narayanan, New Castle, DE (US); Joyesh Sengupta, Newark, DE (US); Melissa Feldsher, New York, NY (US); Zachary R Warman, Wheaton, IL (US); Jegatheeswaran Pandian, Monroe, NJ (US); Matthew Hoke, Audubon, NJ (US); Sanjay Durgadin, Hockessin, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/313,171

(22) Filed: May 5, 2023

(65) Prior Publication Data

US 2023/0410081 A1 Dec. 21, 2023

Related U.S. Application Data

(60) Provisional application No. 63/364,946, filed on May 18, 2022, provisional application No. 63/364,942, filed on May 18, 2022.

(51) Int. Cl.
*G06Q 40/03* (2023.01)
*G06Q 20/24* (2012.01)

(52) U.S. Cl.
CPC ............. *G06Q 40/03* (2023.01); *G06Q 20/24* (2013.01)

(58) Field of Classification Search
None
See application file for complete search history.

(56) References Cited

U.S. PATENT DOCUMENTS

| 2019/0370263 | A1* | 12/2019 | Nucci | G06F 16/254 |
| 2021/0398104 | A1* | 12/2021 | Yan | G06Q 20/065 |
| 2023/0116961 | A1* | 4/2023 | Braathen | G06Q 20/384 705/40 |

* cited by examiner

*Primary Examiner* — Edward Chang
(74) *Attorney, Agent, or Firm* — GREENBERG TRAURIG LLP

(57) ABSTRACT

In some aspects, the techniques described herein relate to a method including: receiving, at a transaction decisioning platform, a customer pre-approval notification; receiving, at the transaction decisioning platform, a stream of transactions, wherein the transactions are associated with a demand deposit account and the demand deposit account is associated with a customer; receiving, at the transaction decisioning platform, a total finance amount for the customer; applying a transaction eligibility rule to each transaction in the stream of transactions; determining, based on application of the transaction eligibility rule, that one of the transactions from the stream of transactions is eligible for a credit product; determining, based on a customer eligibility variable, that the customer is eligible for the credit product; and including the one of the transactions from the stream of transactions on an eligible transaction list.

6 Claims, 6 Drawing Sheets

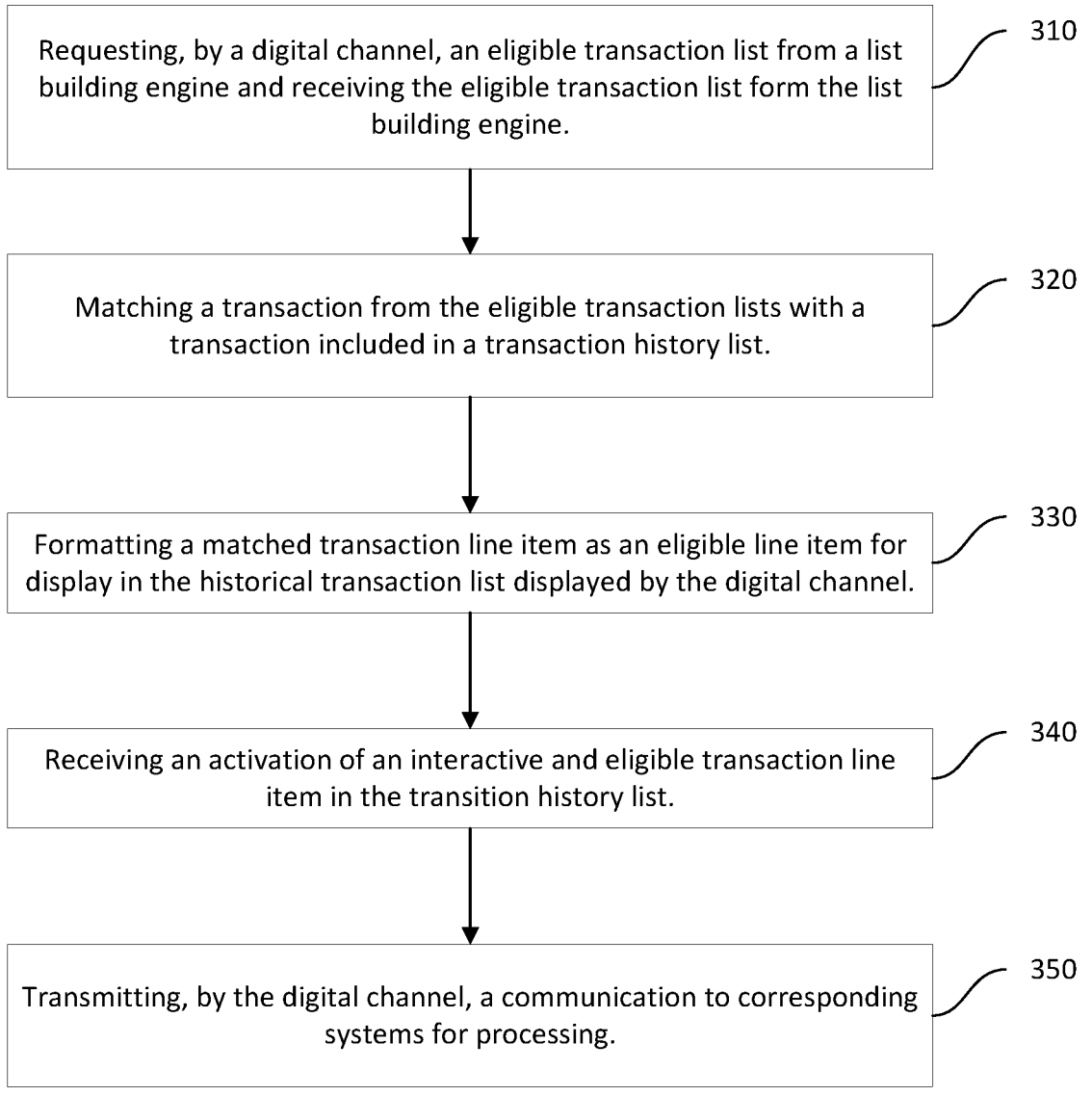

Requesting, by a digital channel, an eligible transaction list from a list building engine and receiving the eligible transaction list form the list building engine.          310

Matching a transaction from the eligible transaction lists with a transaction included in a transaction history list.          320

Formatting a matched transaction line item as an eligible line item for display in the historical transaction list displayed by the digital channel.          330

Receiving an activation of an interactive and eligible transaction line item in the transition history list.          340

Transmitting, by the digital channel, a communication to corresponding systems for processing.          350

FIGURE 3

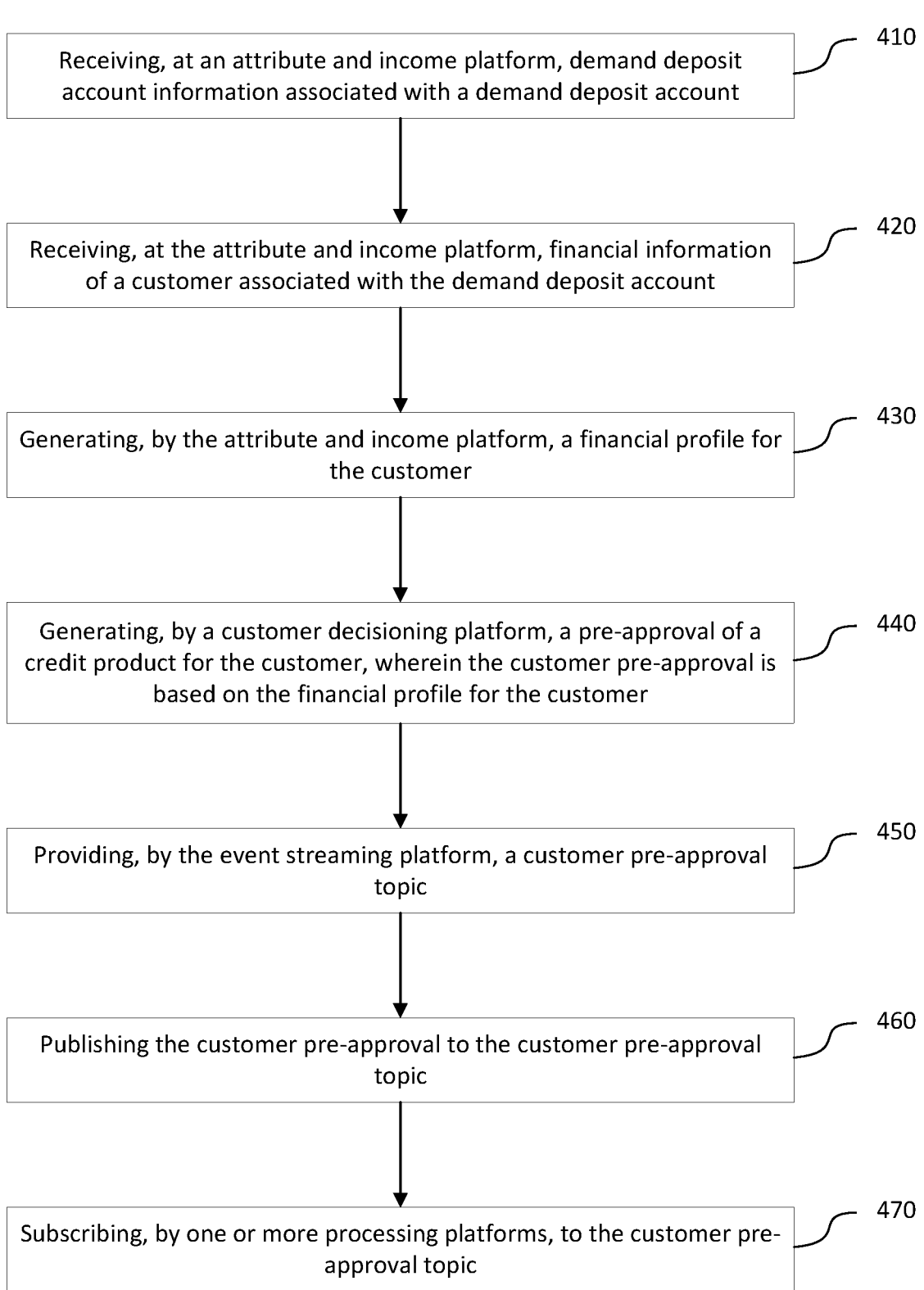

Receiving, at an attribute and income platform, demand deposit account information associated with a demand deposit account — 410

Receiving, at the attribute and income platform, financial information of a customer associated with the demand deposit account — 420

Generating, by the attribute and income platform, a financial profile for the customer — 430

Generating, by a customer decisioning platform, a pre-approval of a credit product for the customer, wherein the customer pre-approval is based on the financial profile for the customer — 440

Providing, by the event streaming platform, a customer pre-approval topic — 450

Publishing the customer pre-approval to the customer pre-approval topic — 460

Subscribing, by one or more processing platforms, to the customer pre-approval topic — 470

FIGURE 4

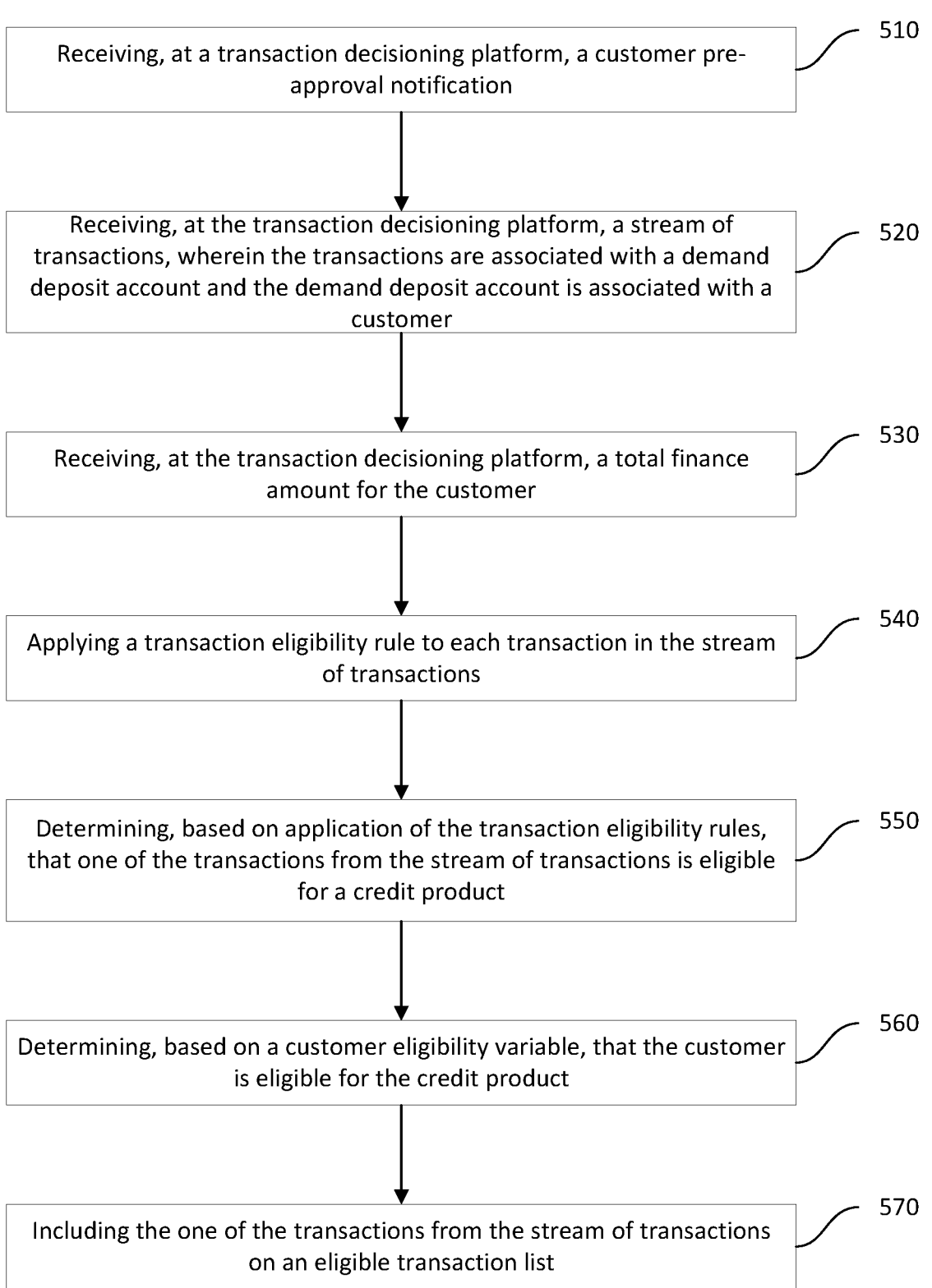

510 Receiving, at a transaction decisioning platform, a customer pre-approval notification 520 Receiving, at the transaction decisioning platform, a stream of transactions, wherein the transactions are associated with a demand deposit account and the demand deposit account is associated with a customer 530 Receiving, at the transaction decisioning platform, a total finance amount for the customer 540 Applying a transaction eligibility rule to each transaction in the stream of transactions 550 Determining, based on application of the transaction eligibility rules, that one of the transactions from the stream of transactions is eligible for a credit product 560 Determining, based on a customer eligibility variable, that the customer is eligible for the credit product 570 Including the one of the transactions from the stream of transactions on an eligible transaction list

FIGURE 5

SYSTEMS AND METHODS FOR CONTINUOUSLY UPDATING AND RUNTIME PROCESSING OF DECISIONING

RELATED APPLICATIONS

This application claims the benefit of U.S. Provisional Patent Application Ser. No. 63/364,942, filed May 18, 2022, and U.S. Provisional Patent Application Ser. No. 63/364,946, filed May 18, 2022, the disclosures of which are hereby incorporated, by reference, in their entirety.

BACKGROUND

The present disclosure generally relates to systems and methods for providing continuously updated decisioning.

Recently, organizations that provide credit products have introduced products that allow a customer to finance a single transaction with an installment loan. Such credit products provide a unique opportunity for organizations that offer both demand deposit accounts (DDAs) that may be associated with payment products (e.g., a checking account that has a debit card associated with the account) and credit/financing products. Because DDA's are often used as the source of payment for customer transactions, organizations that offer such accounts have detailed insight to transactions that may be eligible for transaction installment loans. But, due to the ever-changing nature of factors such as account balances, customers' credit statuses, the rapid and continuous rate at which transactions may be made, and the sheer number of transactions (many millions per day) that a providing organization must process, the technical challenges in decisioning which transactions are eligible and then presenting the transactions in a timely manner to a customer are many and difficult.

To illustrate the technical challenges, consider that customers that regularly use DDAs and associated payment products (e.g., a debit card associated with the DDA) for transactions can generate high volumes of transactions over relatively short amounts of time. Moreover, when it is considered that a providing organization has a high volume of customers that regularly use DDAs and associated products for transactions, it will be appreciated that run-time processing of the total volume of transactions by an institution's technology infrastructure for credit product decisioning would not be practical and would likely not even be possible without dedicating an unmanageable and cost-ineffective amount of resources (both technical and human) to such a process. Nevertheless, given certain credit-based products' applicability to individual transactions (such as short-term installment-based credit products), the ability to efficiently process transaction-level data, process decisioning based on transaction-level data, and process acceptance of credit products for individual transactions is needed.

SUMMARY

In some aspects, the techniques described herein relate to a method including: receiving, at a transaction decisioning platform, a customer pre-approval notification; receiving, at the transaction decisioning platform, a stream of transactions, wherein the transactions are associated with a demand deposit account and the demand deposit account is associated with a customer; receiving, at the transaction decisioning platform, a total finance amount for the customer; applying a transaction eligibility rule to each transaction in the stream of transactions; determining, based on application of the transaction eligibility rule, that one of the transactions from the stream of transactions is eligible for a credit product; determining, based on a customer eligibility variable, that the customer is eligible for the credit product; and including the one of the transactions from the stream of transactions on an eligible transaction list.

In some aspects, the techniques described herein relate to a method, wherein the transaction decisioning platform subscribes to a customer pre-approval topic and receives the customer pre-approval notification via the customer pre-approval topic.

In some aspects, the techniques described herein relate to a method, wherein the transaction decisioning platform subscribes to a demand deposit account (DDA) transactions topic, and receives the stream of transactions via the DDA transactions topic.

In some aspects, the techniques described herein relate to a method, wherein the transaction decisioning platform subscribes to a total finance amount topic and receives a total finance amount for the customer via the total finance amount topic.

In some aspects, the techniques described herein relate to a method, wherein the customer eligibility variable is updated based on the total finance amount for the customer.

In some aspects, the techniques described herein relate to a method, wherein the customer eligibility variable is updated based on the customer pre-approval notification.

In some aspects, the techniques described herein relate to a method, including: publishing the one of the transactions to an eligible transaction topic.

In some aspects, the techniques described herein relate to a system including at least one computer including a processor, wherein the at least one computer is configured to: receive, at a transaction decisioning platform, a customer pre-approval notification; receive, at the transaction decisioning platform, a stream of transactions, wherein the transactions are associated with a demand deposit account and the demand deposit account is associated with a customer; receive, at the transaction decisioning platform, a total finance amount for the customer; apply a transaction eligibility rule to each transaction in the stream of transactions; determine, based on application of the transaction eligibility rule, that one of the transactions from the stream of transactions is eligible for a credit product; determine, based on a customer eligibility variable, that the customer is eligible for the credit product; and include the one of the transactions from the stream of transactions on an eligible transaction list.

In some aspects, the techniques described herein relate to a system, wherein the transaction decisioning platform subscribes to a customer pre-approval topic and receives the customer pre-approval notification via the customer pre-approval topic.

In some aspects, the techniques described herein relate to a system, wherein the transaction decisioning platform subscribes to a demand deposit account (DDA) transactions topic, and receives the stream of transactions via the DDA transactions topic.

In some aspects, the techniques described herein relate to a system, wherein the transaction decisioning platform subscribes to a total finance amount topic and receives a total finance amount for the customer via the total finance amount topic.

In some aspects, the techniques described herein relate to a system, wherein the customer eligibility variable is updated based on the total finance amount for the customer.

In some aspects, the techniques described herein relate to a system, wherein the customer eligibility variable is updated based on the customer pre-approval notification.

In some aspects, the techniques described herein relate to a system, including: publishing the one of the transactions to an eligible transaction topic.

In some aspects, the techniques described herein relate to a non-transitory computer readable storage medium, including instructions stored thereon, which instructions, when read and executed by one or more computer processors, cause the one or more computer processors to perform steps including: receiving, at a transaction decisioning platform, a customer pre-approval notification; receiving, at the transaction decisioning platform, a stream of transactions, wherein the transactions are associated with a demand deposit account and the demand deposit account is associated with a customer; receiving, at the transaction decisioning platform, a total finance amount for the customer; applying a transaction eligibility rule to each transaction in the stream of transactions; determining, based on application of the transaction eligibility rule, that one of the transactions from the stream of transactions is eligible for a credit product; determining, based on a customer eligibility variable, that the customer is eligible for the credit product; and including the one of the transactions from the stream of transactions on an eligible transaction list.

In some aspects, the techniques described herein relate to a non-transitory computer readable storage medium, wherein the transaction decisioning platform subscribes to a customer pre-approval topic and receives the customer pre-approval notification via the customer pre-approval topic.

In some aspects, the techniques described herein relate to a non-transitory computer readable storage medium, wherein the transaction decisioning platform subscribes to a demand deposit account (DDA) transactions topic, and receives the stream of transactions via the DDA transactions topic.

In some aspects, the techniques described herein relate to a non-transitory computer readable storage medium, wherein the transaction decisioning platform subscribes to a total finance amount topic and receives a total finance amount for the customer via the total finance amount topic.

In some aspects, the techniques described herein relate to a non-transitory computer readable storage medium, wherein the customer eligibility variable is updated based on the total finance amount for the customer.

In some aspects, the techniques described herein relate to a non-transitory computer readable storage medium, wherein the customer eligibility variable is updated based on the customer pre-approval notification and including: publishing the one of the transactions to an eligible transaction topic.

BRIEF DESCRIPTION OF THE DRAWINGS

FIG. 3 is a logical flow of runtime processing of a digital channel, in accordance with aspects.

FIG. 4 is a logical flow for credit decisioning in accordance with aspects.

FIG. 5 is a logical flow for providing eligible transactions to a digital channel, in accordance with aspects.

DETAILED DESCRIPTION

Figure 1:
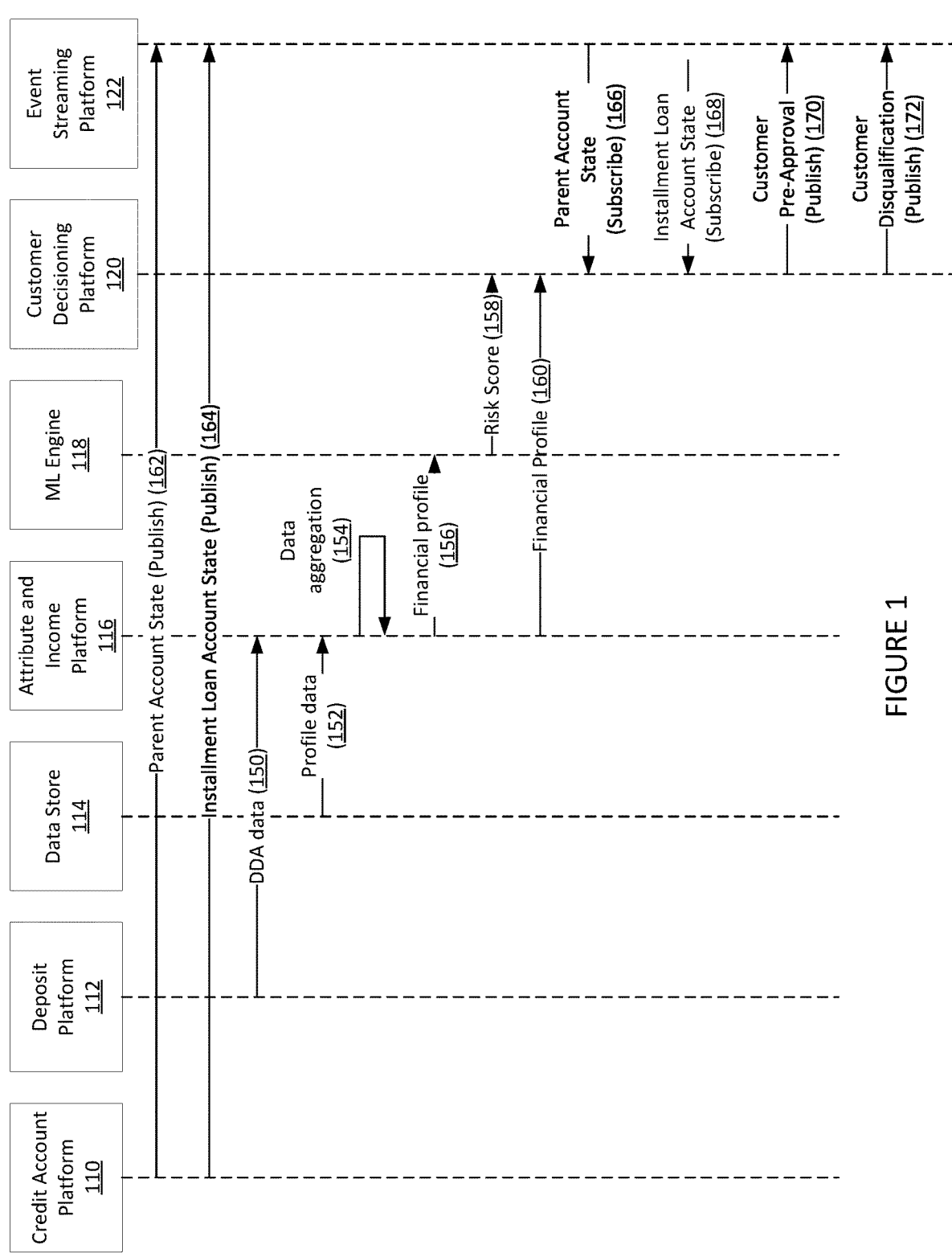
FIG. 1 is a sequence diagram for a decisioning process, in accordance with aspects.

Aspects are directed to systems and methods for providing continuously updated decisioning.

Aspects may provide continuous evaluation and updating of a customer's eligibility for a credit product such that relevant events may be evaluated in real-time, alongside the customer's continuous stream of transactions such that an eligible transaction list may be constantly maintained and updated. Moreover, techniques described herein allow an eligible transaction list to be retrieved and list entries to be formatted for display and interaction by the customer in a digital channel such as a mobile application or a web page. Conventional systems that rely on batch processing of massive or even relatively large amounts of data at runtime to decision a customer and the customer's transactions and then format eligible transactions would produce unacceptable latency as a digital channel was launched by the customer. However, using the techniques described herein, customer and transaction eligibility decisioning is continually performed via event streaming techniques, and further allow for only transactions that have been decisioned as eligible to undergo specific formatting at runtime when the customer authenticates to a digital channel to view transactions. Such pre-differentiation between eligible and non-eligible transactions enables processing efficiency to return formatted eligibility results in a relatively small amount of time (e.g., 300 ms) that is acceptable to customers.

Aspects may include a global credit account platform that can act as a system of record for aspects described herein. A system of record (SoR), as used herein, refers to a computer system including a storage system (e.g., a relational database) that is an authoritative source for a particular data element or a piece, or set, of electronic information (e.g., information associated with a credit account of a customer). A credit account platform may act as a SoR for information related to credit accounts that are associated with an organization's customers. For instance, a credit account platform may provide data that indicates whether a customer has or had a credit account with the organization, whether an account is currently opened, closed, or suspended, whether the account is in good standing or delinquent, whether charges against the account have been written off, etc.

Additionally, a credit account platform can act as the SoR for credit accounts and can facilitate such actions as housing customer credit accounts, maintaining account balances and account ledgers, determining minimum payments on credit accounts, determining payment due dates on credit accounts, determining late payments on credit accounts, determining late fees on credit accounts, etc.

Aspects may also include a core deposit platform that acts as a SoR for demand deposit accounts (DDAs) of an organization's customers, including transactions and other information associated with a debit card for the DDA. A DDA includes accounts such as checking accounts, savings accounts and other accounts where customers can deposit funds and subsequently withdraw the deposited funds on demand or make charges against the funds in the account with an associated payment card, such as a debit card. A deposit platform may include a computer system and storage platform that processes deposits (credits) and debits to an associated DDA, retains a ledger of funds in a DDA, provides a user interface for managing the DDA, etc.

Aspects may further include a data store, such as a data warehouse or a data lake. The data store, however, may be any suitable data store. In some aspects, the data store may be an enterprise data warehouse that aggregates data from different sources and makes the data available for data analysis, data mining, and artificial intelligence (AI) and machine learning (ML) operations. A data warehouse may include a server that performs extract, transform, and load (ETL), or extract, load, and transform (ELT) operations on data received from multiple sources. The ELT and/or ETL operations may include preparatory operations such as cleaning, standardizing, normalizing, and/or other data operations. A data warehouse may persist received data to a relational database, an online analytical processing (OLAP) database, or another appropriate type of database. The data warehouse may also include a user interface and reporting tools and may publish private and/or public application programming interfaces (APIs) for programmatic submission and retrieval of data stored therein.

Systems may further include an attribute and income platform. An attribute and income platform may operate as a service that collects, aggregates, and stores customer attributes, including financial information associated with a customer, and can store the information for use by other platforms and systems. The financial information can include information regarding the customer's loans and other financial dealings with the hosting institution (which may be, e.g., a financial institution). Types of data that the attribute and income platform may collect and aggregate include mortgage loan information, auto loan information, deposit account information, retirement account information, income information from the customer, etc. An attribute and income platform may retrieve/receive data from disparate systems of the hosting institution that provides a holistic financial view/profile of a customer regarding the customer's relationship and accounts with the institution. In some aspects, information from outside the institution can also be collected at an attribute and income services platform and incorporated into a customer's financial profile. An example of outside information may be credit ratings published by various credit rating agencies. Credit rating agencies may also provide loan information from other financial institutions that may be consumed and stored by an attribute and income platform.

Aspects may include a machine learning (ML) engine that includes one or more servers that execute ML algorithms and/or machine learning models and that accept data as an input to a ML algorithm or model and process the data according to the ML algorithm or model. The output of a ML engine includes "predictions" such as inferences from a ML model regarding relationships among data points of the input data. A machine learning algorithm of a ML engine may act as a training function and may take training data sets as input that train (i.e., fit training data to) a corresponding ML model for modeling of input data and for providing predictions as output based on the modeled data.

Aspects may include processing of a customer's financial profile (as aggregated by an attribute and income services platform) by an ML engine in order to infer a risk profile based on the financial profile. A risk profile may measure risk associated with a likelihood that a customer will default on a credit loan and may include a risk score. A risk score can be provided on an appropriate scale (such as a 100-point scale, a 10-point scale, etc.). Accordingly, an exemplary risk score may be a 75 on a 100-point scale where, as the score increases, the likelihood of default also increases. Risk scores, however, can be configured on any necessary or desirable scale and with any suitable point value system.

Aspects may additionally include a customer decisioning platform. A customer decisioning platform can include logic and functions that take information, including a risk score, and other profile information from a customer, and may output credit decisions associated with the customer. The decisions may include product offerings (e.g., credit product offerings) for the customer. The customer decisioning platform can include custom logic, the result of which can manifest in a pre-approval of a customer for a credit product offered by the hosting institution, or a decision not to offer a credit product to a customer.

Aspects may also include a distributed event streaming platform (e.g., Apache Kafka®) for handling of associated events in the form of real time and near-real time streaming data to and from streaming data pipelines and/or streaming applications. Streaming data may be continuously generated by a data source. An event streaming platform can receive streaming data from multiple sources and process the data sequentially and incrementally. Event streaming platforms can be used in conjunction with real time and near-real time streaming data pipelines and streaming applications. For example, an event streaming platform can ingest and store streaming data from the data pipeline and provide the data to an application that process the streaming data. An event streaming platform may include partitioned commit logs (each, an ordered sequence of records) to store corresponding streams of records. The logs are divided into partitions, and a subscriber can subscribe to a "topic" that is associated with a partition, and thereby receive all records stored at the partition (e.g., as passed to the subscriber in real time by the platform).

An event streaming platform may expose a producer API that publishes a stream of records to a topic, and a consumer API that a consumer application can use to subscribe to topics and thereby receive the record stream associated with that topic. An event streaming platform may also publish other APIs with necessary or desired functionality.

Aspects may further include a lending innovation platform that is an experience platform that can create the customer experience required to offer a credit product to a customer. A lending innovation platform may build, or components thereof may be displayed in, a customer-facing interface.

Aspects may also include a marketing platform. A marketing platform may be configured to provide a customer with contextual offers based on previous activity recorded by the hosting institution. Such previous activity can include transactions, mobile app usage, website usage, third-party data associated with the customer, etc. In the context of a credit product, a marketing platform can provide consumer products and services for which a customer can employ an offered credit product in order to pay for the consumer product or service.

In accordance with aspects, approval decisioning for a credit product can be executed based on a financial profile of a customer and a risk score of a customer.

In accordance with aspects, an attribute and income platform can receive DDA information from a core deposit platform. The DDA information can include information about a customer's account, including transactions, debit card information, an account balance, etc. The attribute and income services platform can also receive, from a data store, information that can be aggregated in order to create the customer's financial profile, such as the information noted, above, with respect to a customer's financial profile. The attribute and income services platform can aggregate the DDA information, and the data received from the data store that includes all of the customer's financial activity and accounts with the hosting institution, to create a holistic financial profile for the customer.

In accordance with aspects, after aggregation, an attribute and income platform may send the customer's financial profile to a ML learning engine, and the machine learning engine can receive the financial profile and process the data included in the financial profile to produce a risk score for the customer based on the financial profile. In accordance with aspects, exemplary data that may be sent to a ML engine and/or decisioning engine (and that may also be included in a financial profile) includes whether a customer has an eligible DDA; whether the DDA has a minimum timeframe (e.g., a minimum of 90 days) of regular inflow funding (e.g., regular deposits by an employer, or from another source); a minimum average balance of the DDA; a minimum current balance of the DDA; a minimum account-opened period (e.g., has the account been opened at least 6 months?); a minimum age of the customer associated with the DDA; whether the customer has an eligible payment (i.e., debit) card linked to the DDA; whether the customer is an auto or home owner and the status of any loans on the customer's auto or home; etc.

After processing profile data from an attribute and income platform, the ML engine can then transmit the risk score to the customer decisioning platform. Likewise, after aggregation, the attribute and income services platform can send the customer's holistic financial profile to the customer decisioning platform. The customer decisioning platform may receive the customer's financial profile and the risk score associated with the profile data and may use the risk score and the financial profile data in an eligibility decisioning process for issuing credit products, such as installment loans for transaction line items on a DDA ledger. In some aspects, the customer decisioning platform may receive the financial profile in parallel with the risk score.

In accordance with aspects, a credit account platform may be a SoR with respect to credit accounts provided to customers of a providing institution. A credit account platform may store credit account data related to credit accounts associated with a customer. Credit account data may include details and metadata with respect to a parent credit account and installment loan accounts that are sub accounts of a parent account. A parent credit account may be a parent to one or more installment loan accounts. That is, a parent account may be a hierarchical account at the top of a hierarchy, under which one or more installment loan accounts are issued. A state of a parent credit account may affect decisioning as to whether one or more installment loans are issued under the parent account.

In accordance with aspects, one or more installment loan accounts may be issued under a customer's parent credit account. If a customer's parent credit account is in good standing (i.e., hasn't been disqualified for issuance of additional installment loan instances for any reason) then one or more installment loan accounts may be generated under the parent account. In accordance with aspects, a state of an installment loan account issued under a parent credit account may affect the state of the parent credit account.

A credit account platform may publish account details with respect to a parent credit account to a topic provided by an event streaming platform. An event streaming platform may provide a parent account state topic for a parent credit account of a customer. A credit account platform may push account details of the parent credit account to the parent account state topic. Parent credit account details published to the topic may include changes in the parent credit account state, such as whether the account is opened, closed, delinquent, or has been charged-off (i.e., written off for business and/or accounting purposes).

A credit account platform may also publish account data with respect to a state of an installment loan account of a customer to a topic provided by an event streaming platform. An event streaming platform may provide an installment loan account state topic for an installment loan account of a customer. Installment account details that may be published to a corresponding topic may include whether the account is opened, closed, suspended, delinquent, etc.

In accordance with aspects, a customer decisioning platform may subscribe to a parent credit account topic and/or an installment loan account topic that is published by an event streaming platform and that corresponds to a customer parent credit account or a customer installment loan account. A customer decisioning platform may use the streamed account data in a decisioning process for approving or disqualifying a corresponding customer for one or more installment loans and associated accounts.

A customer decisioning platform may subscribe to a parent account state topic published by an event streaming platform. A customer decisioning platform may receive parent credit account data sent to the topic by a credit account platform as a stream of data from an event streaming platform. Moreover, a customer decisioning platform may subscribe to an installment loan account state topic published by an event streaming platform. A customer decisioning platform may receive installment loan account data sent to the topic by a credit account platform as a stream of data from an event streaming platform. A customer decisioning platform may use the data received from the parent account state topic and the installment loan account state topic as input data in decisioning eligibility of an associated customer for one or more installment loan accounts.

In accordance with aspects, a customer decisioning platform may determine eligibility of a customer for an installment loan account and corresponding installment loan based on a parent account state provided by a credit account platform, one or more installment loan account states provided by a credit account platform, a financial profile as aggregated by an attribute and income platform, and a risk score generated by a ML engine and based on a financial profile of a customer. Each of the parent account state, the installment loan account state, the financial profile, and the risk score may be associated with the relevant customer. The customer decisioning platform may determine, based on the customer's aggregated financial profile and the customer's risk score whether to pre-approve the customer for an installment loan or other credit product that is offered by the providing institution. Moreover, the customer decisioning platform may provide, as part of a pre-approval decision for a customer, a total finance amount that may be applied to transaction installment loan offers and that is also based on the factors received by the customer decisioning platform.

In some aspects, a credit account platform may provide a total finance amount for a customer based on the credit account platform's retained global credit account data with respect to a customer. In such aspects, a credit account platform may periodically update a total finance amount associated with a customer and may transmit changes in a customer's total finance amount to an event streaming platform with, e.g., a parent account state update and/or an installment loan account state update to respective topics provided by an event streaming platform. In such aspects, a customer decisioning platform may receive the total finance amount from the event streaming platform and may include the total finance amount in data published to a customer pre-approval topic as discussed in more detail, herein.

In accordance with aspects, a transaction installment loan may include an installment type credit product that allows the customer to pay for a purchase over several time-based installments. The relevant purchase may be a purchase paid for from a DDA and recorded as a transaction on a ledger of the DDA. For instance, an installment loan product may be a 4-installment payment product, where the installment payments are scheduled weekly, monthly, or at some other increment. An installment-based credit product is only exemplary, and the techniques described herein can be used to provision other types of credit products.

In accordance with aspects, a total financing amount may be the total amount of funds that a customer may receive for an offer of one or more installment loans. That is, if a total finance amount is one thousand dollars ($1000), then a customer may be eligible for a number of installment loans that are equal to or less than the total finance amount. For instance, if a customer has been pre-approved and has been allocated a total finance amount of $1000, then that customer may be eligible for a transaction installment loan on a first transaction that totaled $500, a second transaction that totaled $300, and a third transaction that totaled $200. If, however, the customer has accepted an offered loan for each of the transactions mentioned above, then the customer may not be eligible for additional transaction installment loans until an actual financed amount falls back below the customer's total finance amount.

In accordance with aspects, once the customer decisioning platform has determined whether to approve or deny a credit product based on, e.g., the factors mentioned, above, the customer decisioning platform can send the decision to a distributed event streaming platform. That is, the customer decisioning platform can publish the information to a topic provided by an event streaming platform. For instance, the customer decisioning platform may publish a pre-approval for an installment loan account to a customer pre-approval topic provided by an event streaming platform. Moreover, the customer decisioning platform may publish a denial of approval or a disqualification for an installment loan account to a customer disqualification topic provided by an event streaming platform. In some aspects, the decisioning engine may publish a pre-approval and a disqualification to the same topic for a given customer. Other systems and platforms may subscribe to the topic or topics in order to determine whether a customer is pre-approved for an installment loan account and corresponding loan, or whether they are disqualified or ineligible for such an account and corresponding loan.

In accord with aspects, the process of decisioning an approval or a denial of a credit product for a customer can be ongoing and can incorporate changes in the customer's financial profile and/or changes in a parent or installment loan account state. Changes in the customer's financial profile can result in changes in the customer's risk score, which is based on the customer's financial profile. Other factors that are incorporated into the customer's holistic financial profile can also result in changes to the decisioning of the customer decisioning platform. For example, a customer may pay down, or pay off, one or more other loans that the customer has with the hosting institution, or another institution (and which is reported to the hosting institution and incorporated into the customer's financial profile). A customer may pay off an auto loan, a mortgage, etc., which may affect the customer's ability to assume more debt in the form of a credit product offered by the hosting institution. Conversely, the customer may miss several payments, or go into default, with respect to an existing credit loan, and this may cause a denial of further credit accounts by the customer decisioning platform.

In order to keep decisions made by the customer decisioning platform "evergreen" with profile information, account information, and risk scores that are based on current information, the decisioning process described above can be continually executed. Continual execution can be facilitated through time-based batch processing of the steps described herein. For instance, a customer profile and a risk score can be updated every day, week, month, etc., and a corresponding updated decision can be published to a distributed event streaming platform for consumption. Moreover, a decisioning engine may receive, in real time or near-real time, changes in topics (such as parent account state and installment loan account state) that it subscribes to and may publish a change in approval status to appropriate topics such that other systems and platforms that subscribe to the topics can determine a customer's account eligibility.

In other aspects, trigger events may be defined that, when detected, trigger a fresh decisioning cycle. For example, a missed payment on an existing credit account or product may be listened for in a hosting institution's various SoRs, and when encountered may start a decisioning cycle in real time. The real-time decisioning cycle may include all or some of the steps described, above. The real-time decisioning cycle can result in non-approval of new credit product offerings for a customer until a later decisioning cycle that indicates a lower risk for the customer. Likewise, remedial actions (e.g., bringing an existing credit account current) may also trigger a real-time decisioning cycle that may result in approval decisioning for other credit products.

FIG. 1 is a sequence diagram for a decisioning process, in accordance with aspects. FIG. 1 includes credit account platform 110, deposit platform 112, data store 114, attribute and income platform 116, machine learning (ML) engine 118, customer decisioning platform 120, and event streaming platform 122.

In accordance with aspects, at step 150 deposit platform 112 may send DDA data to attribute and income platform 116. For instance, deposit platform 112 may send DDA information for one or more accounts owned by customers of the providing institution that maintain a DDA with the providing institution. DDA information may include an account balance, line-item transactions from a debit card linked to the account, deposits, withdrawals, an indication of whether the account is overdrawn or has been overdrawn within a given time period, and other account information as is necessary or desired. Deposit platform 112 may send the account information in any suitable manner. For instance, the account data may be sent as a batch file on a recurring basis (e.g., hourly, daily, etc.), the account data may be sent via an API to attribute and income platform 116, the account data may be sent as a data stream to attribute and income platform 116, etc.

In accordance with aspects, at step 152 data store 114 may send financial profile data to attribute and income platform 116. Data store 114 may be any suitable data store, such as an enterprise-level data warehouse, a relational database, a data lake, etc. Data store 114 may receive data from multiple SoRs maintained by a providing institution. Exemplary SoRs include lending systems that maintain records of various loans issued by the providing institution to a customer, investment accounts and balances held by a customer, payment card accounts (e.g., such as credit card accounts) including balances and payment records of a customer, etc. In some aspects, data store 114 may receive data from sources outside of the providing institution. For instance, financial and debt accounts from other institutions may be received and credit ratings from credit agencies may be received via, e.g., external API gateways. Any data that is available to data store 114 and that may be desirable for generation of a holistic financial profile of a customer may be collected at data store 114. All data collected at data store 114 may include a relational link to a customer of the providing institution, so that a financial profile generated from the collected data may be associated with a particular customer.

At step 154, attribute and income platform 116 may aggregate the data received into a holistic financial profile for the customer. The holistic financial profile may include data received from deposit platform 112 and from data store 114. As noted, above, a holistic financial profile of a customer may include data from various systems. The data may be sent to data store 114 and collected and aggregated by attribute and income platform 116 into a financial profile of a customer. A financial profile may include DDA information such as credits, debits, and a balance. A financial profile may further include loan information associated with an organization's customer, credit information of the customer, assets of the customer, the customer's income, etc. An aggregated financial profile may include pertinent information from various organizational systems (and, in some aspects, from outside systems) for decisioning a credit product.

In accordance with aspects, after aggregation, attribute and income platform 116 may send the customer's financial profile to ML engine 118 at step 156, and ML engine 118 may receive the financial profile and process the data included in the financial profile to produce a risk score for the customer based on the financial profile. In accordance with aspects, exemplary data that may be sent to ML engine 118 (and that may also be included in a financial profile) includes whether a customer has an eligible DDA; whether the DDA has a minimum timeframe (e.g., a minimum of 90 days) of regular inflow funding (e.g., regular deposits by an employer, or from another source); a minimum average balance of the DDA; a minimum current balance of the DDA; a minimum account-opened period (e.g., has the account been opened at least 6 months?); a minimum age of the customer associated with the DDA; whether the customer has an eligible payment (i.e., debit) card linked to the DDA; whether the customer is an auto or home owner and the status of any loans on the customer's auto or home, etc.

After processing profile data from an attribute and income platform, ML engine 118 may then transmit the risk score to customer decisioning platform 120 at step 158. Likewise, after aggregation, attribute and income platform 116 may send the customer's holistic financial profile to customer decisioning platform 120 at step 160. Customer decisioning platform 120 may receive the customer's financial profile and the risk score associated with the profile data and may use the risk score and the financial profile data in an eligibility decisioning process for issuing credit products, such as installment loans for transaction line items on a DDA ledger. In some aspects, customer decisioning platform 120 may receive the financial profile in parallel with the risk score.

In accordance with aspects, at step 162 credit account platform 110 may publish account details with respect to a parent credit account to a topic provided by event streaming platform 122. Event streaming platform 122 may provide a parent account state topic for a parent credit account of a customer. Credit account platform 110 may push account details of the parent credit account to the parent account state topic. Parent credit account details published to the topic may include changes in the parent credit account state, such as whether the account is opened, closed, delinquent, or has been charged-off (i.e., written of for business and/or tax purposes).

At step 164, credit account platform 110 may further publish account data with respect to a state of an installment loan account of a customer to a topic provided by event streaming platform 122. Event streaming platform 122 may provide an installment loan account state topic for an installment loan account of a customer. Installment account details that may be published to a corresponding topic may include whether the account is opened, closed, suspended, delinquent, etc.

Customer decisioning platform 120 may subscribe to a parent credit account topic and/or an installment loan account topic that is published by event streaming platform 122 and that corresponds to a customer parent credit account and a customer installment loan account. Customer decisioning platform 120 may use the streamed account data in a decisioning process for approving or disqualifying a corresponding customer for one or more installment loans and associated accounts.

At step 166, customer decisioning platform 120 may subscribe to a parent account state topic published by event streaming platform 122. Customer decisioning platform 120 may receive parent credit account data sent to the topic by credit account platform 110 as a stream of data from event streaming platform 122. Moreover, at step 168, customer decisioning platform 120 may subscribe to an installment loan account state topic published by event streaming platform 122. Customer decisioning platform 120 may receive installment loan account data sent to the topic by credit account platform 110 as a stream of data from event streaming platform 122. Customer decisioning platform 120 may use the data received from the parent account state topic and the installment loan account state topic as input data in decisioning eligibility of an associated customer for one or more installment loan accounts.

At step 170, customer decisioning platform 120 may publish customer pre-approval events to a topic provided by event streaming platform 122. For instance, the customer decisioning platform may publish a pre-approval for an installment loan account to a customer pre-approval topic provided by customer decisioning platform 120. Moreover, customer decisioning platform 120 may publish a denial of approval or a disqualification for an installment loan account to a customer disqualification topic provided by event streaming platform 122 at step 172. In some aspects, the decisioning engine may publish a pre-approval and a disqualification to the same topic for a given customer. Other systems and platforms may subscribe to the topic or topics in order to determine whether a customer is pre-approved for an installment loan account and corresponding loan, or whether they are disqualified or ineligible for such an account and corresponding loan.

In accordance with aspects, a data store may subscribe to a customer pre-approval topic and/or a customer disqualification topic provide by an event streaming platform and may ingest, and store data streamed from the topic(s) as associated with a particular customer. Moreover, a data store may provide the current approval or disqualification state as a part of the associated customer's financial profile that is sent to a customer decisioning platform and a ML engine in the process described above. This allows a current approval or disqualification state to be part of a customer's financial profile and allows a customer's current approval or disqualification state to be considered as a factor in the generation of a risk score by an ML engine and the ultimate decisioning of a customer's pre-approval state by a customer decisioning platform.

Customer pre-approval or disqualification may be streamed to and from an event streaming platform with a customer identifier, and a data store may store the received pre-approval or disqualification as associated with the relevant customer. The data store may store all data associated with a particular customer using the customer identifier as a key. The data store may use the key when extracting data associated with a customer for transmission to an attribute and income platform.

In accordance with aspects, individual transactions made using a customer's DDA can be evaluated by a providing institution's processing systems to decision whether an individual transaction is eligible to be the basis of a credit offering such as an installment loan. Transaction memos can be streamed in real time to a distributed event streaming platform, and a transaction decisioning platform can be configured to receive the transaction memos and decision a credit product offering.

In accordance with aspects, a customer can be alerted to a credit product offering through a digital channel such as a mobile application, a website, where the mobile application or the website or another suitable digital channel displays, via a user interface, a list of transactions associated with a DDA of the user. For example, the list entry describing a particular transaction that is eligible for a credit product can be displayed in a different color, a different font, a bolded or italicized font, etc. Moreover, list entries can be hyperlinked or deep linked, and a link can lead a customer to an action provided through the digital channel where the customer can accept the credit product offering.

When a customer uses a DDA and an associated payment product for a transaction, two types of transaction notifications can be generated and recorded by the processing institution. The first type is a transaction memo. A transaction memo alerts the customer (e.g., through a digital channel, such as a mobile app of the hosting financial institution) that the transaction has been initiated and approved. And, while the transaction memo is generally posted within a very short timeframe of the actual transaction (often in real time or near-real time), the transaction memo does not reflect settlement of the transaction by the financial institution and the merchant with which the transaction was entered into by the customer. Rather, a "hard-posted" transaction line item represents the settled transaction with the merchant.

Most memo transactions will eventually be converted into hard-posted transactions after settlement has occurred. Completion of settlement, however, can take several days. Thus, when a financial institution wishes to offer the transacting customer a credit product, it can be advantageous to base the offering on the memo transaction, since an offer based on a memo transaction will be available nearly immediately to the customer. Aspects described herein, however, can be applied to both transaction memos and hard-posted transactions, and aspects can transfer an association of a credit product, such as a transaction installment loan, from a memo transaction to a hard-posted transaction once the hard-posted transaction is posted to a customer's account on a deposit platform.

In accordance with aspects, a core deposit platform can stream transaction data, in real time, to a distributed event streaming platform. In some aspects, the transaction data can be real time transaction memos generated at the point of transactions. In other aspects, the transaction data can be transactions that have been settled and are being posted as settled to a DDA (i.e., a hard-posted transaction). A transaction decisioning platform can subscribe to receive the stream of transaction information from an event streaming platform.

The transaction decisioning platform can process a stream of transactions from a deposit platform through pre-eligibility algorithms, the output of which is a decision as to whether the transaction is eligible for application of a transaction installment loan credit product. The pre-eligibility algorithms can include customer pre-approval decisioning outcomes for a customer associated with a particular DDA, as discussed herein. The transaction decisioning platform may execute as a streaming application that processes the transactions as they are received from a distributed event streaming platform and that provides pre-approval decisioning of each transaction received. Any transactions that are decisioned as eligible by the pre-eligibility algorithms can be flagged and added to a list (i.e., an eligible transaction list). In this way, a list of eligible transactions can be processed (e.g., at runtime) as the customer authenticates to a digital channel provided by the hosting institution.

In accordance with aspects, a deposit platform may stream transactions processed against a customer DDA that are received at the deposit platform. A deposit platform may hold account data for a DDA of a customer, and the account data may include such information as an account balance, an account ledger (including debits and credits, a list of transactions for which account funds are used as payment (e.g., via a payment card such as a debit card associated with the account), etc. The deposit platform may publish payment transactions to a topic provided by an event streaming platform. For instance, a deposit platform may publish each memo transaction associated with a DDA to a memo transaction topic. As transactions (e.g., memo transactions) associated with a DDA are received by the deposit platform, the deposit platform may stream each transaction to the event streaming platform via the corresponding topic.

In accordance with aspects, a deposit platform may publish all transactions (e.g., all memo transactions) to a provided topic. The transactions streamed to a topic may each have identifiers that specifies a corresponding DDA that the transaction was made against and a payment product (e.g., a debit card) that was used for the transaction. In this way, streamed transactions can be associated with the correct account and payment product by, e.g., a transaction decisioning platform. Moreover, a credit account platform may store a customer profile which maps customer profiles to corresponding DDAs and payment products that are owned by a customer associated with the customer profile. Account state information streamed to a corresponding topic provided by an event streaming platform may include these mappings. Accordingly, platforms such as a customer decisioning platform and a transaction decisioning platform may determine a DDA, a payment product and a customer profile that are associated with a particular transaction, or any necessary or desirable interrelations among these data points. Platforms may also determine transaction eligibility based on customer, account, and transaction level eligibility criteria, as discussed further, herein.

In accordance with aspects, a transaction decisioning platform may subscribe to a transaction topic, such as a memo transaction topic, and may receive all incoming topics associated with a customer and the customer's corresponding DDA. For each received transaction, a transaction decisioning engine may apply a suite of transaction eligibility rules to determine if the received transaction is eligible for a transaction installment loan.

Transaction eligibility rules may include eligibility checks, some or all of which must be met in order for a particular transaction to qualify for eligibility of a credit product. Moreover, some rules may disqualify a transaction. For instance, a transaction may need to be more than a minimum amount and less than a maximum amount. Certain transaction types may not be eligible for an installment loan offer (i.e., a rule may be a list of excluded transaction types that are not eligible, and if a transaction type identifier matches an identifier on the list, the transaction is not eligible). Moreover, a timestamp of a transaction may need to be within a defined time of the eligibility check. The transaction may be disqualified if there is a dispute tag indicating that the customer has disputed the transaction. Other necessary or desired rules may be evaluated for each transaction to determine eligibility.

A transaction decisioning platform may further consider an associated customer's eligibility for a transaction installment loan, and the associated customer's total finance amount. A transaction decisioning engine may subscribe to a customer pre-approval topic and/or a customer disqualification topic provided by an event streaming platform and may use data streamed from the topics, as described herein, in approving or denying a transaction installment loan for a transaction. For instance, a transaction decisioning platform may check, before issuing an approval of a transaction installment loan for a transaction, that a customer is eligible for a transaction approval loan and that a customer has sufficient funds, based on the customer's total finance amount, that have not been applied to one or more other transaction installment loans. Because eligibility and a total finance amount may change any time an update is received from the customer pre-approval or the customer disqualification topics provided by the event streaming platform, the transaction decisioning engine may check these parameters each time a transaction is otherwise approved for a transaction installment.

In accordance with aspects, if a transaction is approved for a transaction installment loan, and a customer that is associated with the transaction is preapproved for a transaction installment loan and has sufficient funds with respect to a total finance amount, the transaction may be approved for a transaction installment loan. A transaction decisioning platform may publish an approval of a transaction installment loan for a transaction to a topic provided by an event streaming platform. The transaction decisioning platform may stream approvals for eligible transaction to the provided topic, and other systems may subscribe to the topic to receive and further process relevant transactions a transaction installment loan processing. In the case that an eligible transaction becomes stale (e.g., the transaction installment loan is not accepted in a predefined amount of time), the transaction decisioning engine may invalidate the approved transaction installment loan for the relevant transaction. Invalidations of approvals may also be streamed to an offer invalidation topic provided by an event streaming platform and other systems and platforms may further subscribe to the invalidation topic to determine when a transaction installment loan offer has been invalidated/rescinded by the transaction decisioning platform.

Figure 2:
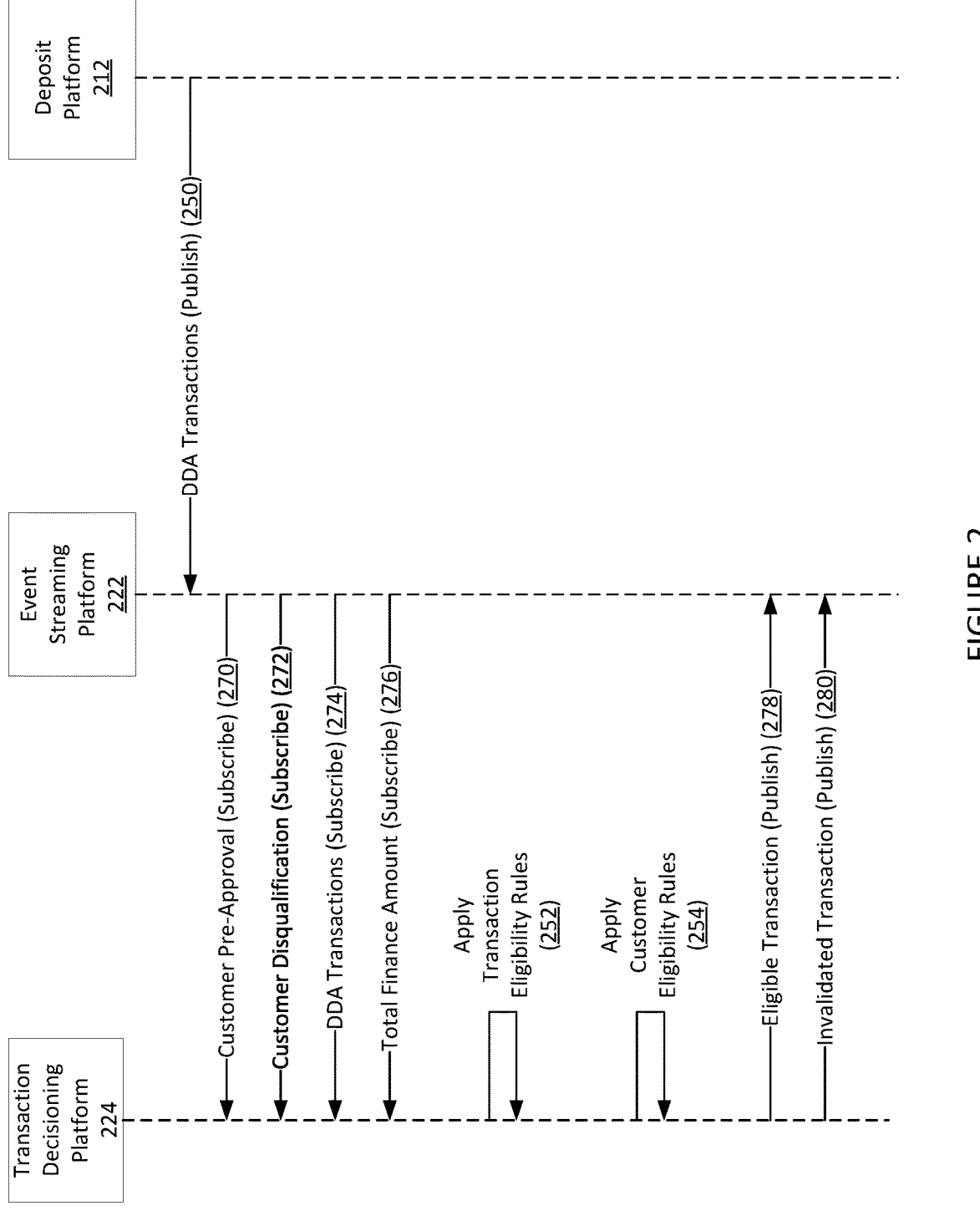
FIG. 2 is a sequence diagram for transaction decisioning, in accordance with aspects.

FIG. 2 is a sequence diagram for transaction decisioning, in accordance with aspects. FIG. 2 includes deposit platform 212, event streaming platform 222, and transaction decisioning platform 224. At step 250, deposit platform 212 may publish transactions (e.g., each memo transaction) that are posted to a DDA associated with deposit platform 212 to a DDA transaction topic provided by event streaming platform 222. Each publication to the DDA transaction topic may include various transaction details whose values may be used to determine whether the transaction is eligible for a transaction installment loan.

At step 270, transaction decisioning platform 224 may subscribe to a customer pre-approval topic provided by event streaming platform 222. The customer pre-approval topic may include an indication whether a relevant customer (a customer associated with a particular topic) is approved for any transaction installment loan offer. The customer pre-approval topic may include other data as further discussed herein. Moreover, transaction decisioning platform 224 may subscribe to the customer disqualification topic provided by event streaming platform 222 at step 272. The customer disqualification topic may stream any disqualification or ineligibility of a customer to transaction decisioning platform 224. At step 274, transaction decisioning platform may subscribe to the DDA transaction topic that is provided by event streaming platform 222 and receive the published stream of DDA transaction from deposit platform 212. At step 276, transaction decisioning platform 224 may also subscribe to a total finance amount topic provided by event streaming platform 222. The total finance amount topic may stream updates to a customer's total finance amount based on criteria discussed, above. As discussed above, a credit account platform may publish updates for a customer's total finance amount to the total finance amount topic provided by event streaming platform 222. In other aspects, a customer's total finance amount may be provided via the customer pre-approval topic.

In accordance with aspects, for each received transaction, transaction decisioning platform 224 may apply transaction eligibility rules at step 252. If, after application of transaction eligibility rules, a transaction is determined to be eligible, transaction decisioning platform 224 may apply customer eligibility rules at step 254 to determine that the relevant customer is still eligible to receive a transaction installment loan and that the relevant customer still has sufficient funds with respect to the customer's total finance amount. If transaction decisioning platform 224 determines that the customer is still eligible and has sufficient credit funds, transaction decisioning platform 224 may issue an eligible transaction notification and publish the eligible transaction notification to an eligible transaction topic at step 278. Various other platforms and system may subscribe to the eligible transaction topic to determine transactions for which a transaction installment loan offer may be made.

The steps described above, may be performed in any necessary or desirable order. For instance, a transaction decisioning engine may first check that a corresponding customer is eligible at large for a transaction installment loan, and then check incoming transactions for eligibility. In some aspects, a transaction decision engine may include a binary eligibility flag for a corresponding customer, The flag's value may be switched based on a last received update from either a customer pre-approval topic or a customer disqualification topic. That is, if a last received update is from a customer pre-approval topic (indicating that a customer is currently eligible for a transaction installment loan) then the eligibility flag may be set to an eligible value. If, however, a last received update is from a customer disqualification topic (indicating that a customer is currently ineligible for a transaction installment loan, then the eligibility flag may be set to an ineligible value. In this way, a transaction decisioning engine may simply and efficiently inspect a binary value to determine customer eligibility.

If a transaction that was previously published as an eligible transaction needs to be invalidated for any reason (e.g., if transaction decisioning platform 224 receives an update indicating that the relevant customer was disqualified for a transaction installment loan, if an update to the relevant customer's total finance amount indicates a transaction is no longer eligible, if an eligible transaction was posted longer than a time limit applied to a loan offer, etc.), then transaction decisioning platform 224 may publish an invalidation for the relevant transaction via an invalidated transaction topic at step 280.

In accordance with aspects, when a transaction installment loan offer is made and excepted based on a memo transaction, and the memo transaction is later updated with a hard-posted transaction (indicating settlement), any corresponding transaction installment may be re-associated with the updated, hard-posted transaction in appropriate systems, and processing and servicing of loan details may proceed with the loan in relation to the recorded, hard-posted transaction.

In accordance with aspects, in order to optimize the display of transactions that are eligible for credit product offerings, only transactions that have been decisioned as eligible undergo alert processing at runtime when the customer authenticates to the digital channel to view transactions. This differentiation between eligible and non-eligible transactions enables processing efficiency to return alerting results in a relatively small amount of time (e.g., 300 ms) that is acceptable to customers.

In accordance with aspects, when a customer authenticates to a digital channel (such as a webpage published by a webserver of a providing institution, or an application (e.g., a mobile application) provided by a providing institution), the digital channel may execute a method (e.g., a getEligibleTxnList method), and the method may retrieve a current list of transactions that are eligible for payment deferral through a credit product such as a transaction installment loan (i.e., an eligible transaction). The method may return a list of eligible transactions.

In accordance with aspects, an eligible transaction list may be built from an eligible transaction topic that is streamed to a list building engine. For instance, a list building engine may subscribe to an eligible transaction topic and an invalidated transaction topic and may receive streaming data from the respective topics. An eligible transaction list may be continually updated with data received from an eligible transaction topic and an invalidated transaction topic. The list building engine may amend the list as transactions are updated. The list building engine may add transactions received from an eligible transaction topic to an eligible transaction list and may delete transactions received from an invalidated transaction topic form an eligible transaction list.

A digital channel may request and process an eligible transaction list at runtime. That is, as the digital channel is launched (e.g., the launching of a mobile application or retrieving of a webpage from a web server, where either may be after authentication), it may request an eligible transaction list and may parse the list. The digital channel may build a list of all transactions made by an associated customer (e.g., either hard-posted or memo transactions) as is conventionally displayed with respect to a DDA ledger-type interface. This conventional list of historic transactions may be referred to as a transaction history list.

The digital interface may receive the eligible transaction list, which may include transaction identifiers for each eligible transaction. The digital channel may parse the list and match eligible transactions from an eligible transaction list to corresponding transactions in a transaction history list built by a digital channel. The digital channel may format a transaction line item in a transaction history list as an eligible transaction. Eligible transaction formatting may take one or more of several different forms. For instance, an eligible transaction may be formatted in a different font, a different font color, may be formatted as a hyper link or a deep link, may be formatted with additional information that is not present in line items displayed for ineligible transactions, etc. Any suitable formatting that sets the transaction line item for an eligible transaction visually apart from an ineligible transaction line item in a transaction history list may be applied. Moreover, any functional formatting (e.g., hyper or deep link formatting) that is necessary or desirable for facilitating acceptance of a credit product that may be applied to an eligible transaction may additionally or alternatively be applied.

In accordance with aspects, formatting and other processing of an eligible transaction list may be applied at runtime of the digital channel within acceptable performance bounds, because an eligible transaction list will be prepopulated and will be relatively light-weight and efficient to retrieve. As noted above, the techniques described herein facilitate formatting of updated eligible transactions in a transaction history list at runtime of the displaying digital channel because the list is pre-populated and continually updated prior to its retrieval by a digital channel. Accordingly, only relatively few steps must be executed by a digital channel in order to display a current list of eligible transactions, and these steps may be processed with relatively low latency that will be acceptable to a customer during the launch of a digital channel.

In accordance with aspects, once eligible transactions are appropriately formatted and displayed in a transaction history list, a customer may interact with the eligible transactions in order to accept an offered credit product, such as a transaction installment loan, and apply the product to the eligible transaction. For instance, in the case where an eligible transaction is formatted as a hyper link or a deep link, a customer may activate the link and the link may launch a different interface (in the same or a different digital channel) and the different interface may facilitate interaction by the customer that applies the offered credit product to the corresponding eligible transaction. Upon acceptance of an offered credit product, a digital channel may transmit associated communications to related processing components. For instance, a digital channel may update a credit account platform with the amount of credit supplied by the offered and accepted credit product. That is, if an accepted credit product was applied to a $150 transaction, a digital channel may send a notification to a credit account platform with the financed amount (i.e., $150 in this example), and the credit account platform may update the corresponding customer's total finance amount by reducing the total finance amount by $150. This is turn may cause many other updates to be performed as noted, herein.

For instance, if an update to a total finance amount results in the customer being at, close to, or over the customer's generated total finance amount, this may prompt a credit account platform to send an update to a customer decisioning platform and/or a transaction decisioning platform. In turn, such an update may cause a customer decisioning platform to publish a customer disqualification event and/or a transaction decisioning platform to publish invalidations for all eligible transactions on an eligible transaction list (so that no further credit is offered to the customer above the customer's total finance amount). In this way, the acceptance of an offered credit product is included in the ongoing process of a customer's credit worthiness along with the other factors described in more detail, herein.

FIG. 3 is a logical flow of runtime processing of a digital channel, in accordance with aspects.

Step 310 includes requesting, by a digital channel, an eligible transaction list from a list building engine and receiving the eligible transaction list form the list building engine. The request may be in the form of a method, such as an API method exposed by an API gateway of the list building engine. The eligible transaction list may be received as a return parameter of the called method. It may be in the form of a delineated file, an array object, or any other necessary or desired data format.

Step 320 includes matching a transaction from the eligible transaction lists with a transaction included in a transaction history list. The transaction history list may be built by the digital channel from a list of transactions made by the customer against an associated DDA. It may include all transactions made against the associated DDA, as may be available in a conventional interface for displaying transactions associated with a DDA.

Step 330 includes formatting a matched transaction line item as an eligible line item for display in the historical transaction list displayed by the digital channel. The formatting may include visual and/or functional formatting that sets the eligible transaction apart from ineligible transactions in the transaction history list and/or makes the line item interactive (e.g., formatting as a hyper or deep link).

Step 340 includes receiving an activation of an interactive and eligible transaction line item in the transition history list. An activation may include, e.g., a user "clicking" on or, in the case of a touch interface of an electronic device executing the digital channel, touching the formatted transaction line item.

Step 350 includes transmitting, by the digital channel, a communication to corresponding systems for executing techniques, as described herein. For instance, as discussed above, a digital channel may transmit an acceptance of an offered credit product by a customer and/or an amount of an accepted credit product to a credit account platform or other platforms or processing engines.

Other transmissions from a digital channel may include a message to a deposit platform to credit a DDA associated with the transaction for which a credit product was accepted for the financed amount. This may also initiate processing that deducts payment amounts from the associated DDA according to the terms of the credit product and updates related systems with updated total finance amounts, as discussed in more detail, herein.

FIG. 4 is a logical flow for credit decisioning in accordance with aspects.

Step 410 includes receiving, at an attribute and income platform, demand deposit account information associated with a demand deposit account.

Step 420 includes receiving, at the attribute and income platform, financial information of a customer associated with the demand deposit account.

Step 430 includes generating, by the attribute and income platform, a financial profile for the customer.

Step 440 includes generating, by a customer decisioning platform, a pre-approval of a credit product for the customer, wherein the customer pre-approval is based on the financial profile for the customer.

Step 450 includes providing, by the event streaming platform, a customer pre-approval topic.

Step 460 includes publishing the customer pre-approval to the customer pre-approval topic.

Step 470 includes subscribing, by one or more processing platforms, to the customer pre-approval topic.

FIG. 5 is a logical flow for providing eligible transactions to a digital channel, in accordance with aspects.

Step 510 includes receiving, at a transaction decisioning platform, a customer pre-approval notification.

Step 520 includes receiving, at the transaction decisioning platform, a stream of transactions, wherein the transactions are associated with a demand deposit account and the demand deposit account is associated with a customer.

Step 530 includes receiving, at the transaction decisioning platform, a total finance amount for the customer.

Step 540 includes applying a transaction eligibility rule to each transaction in the stream of transactions.

Step 550 includes determining, based on application of the transaction eligibility rules, that one of the transactions from the stream of transactions is eligible for a credit product.

Step 560 includes determining, based on a customer eligibility variable, that the customer is eligible for the credit product.

Step 570 includes including the one of the transactions from the stream of transactions on an eligible transaction list.

Figure 6:
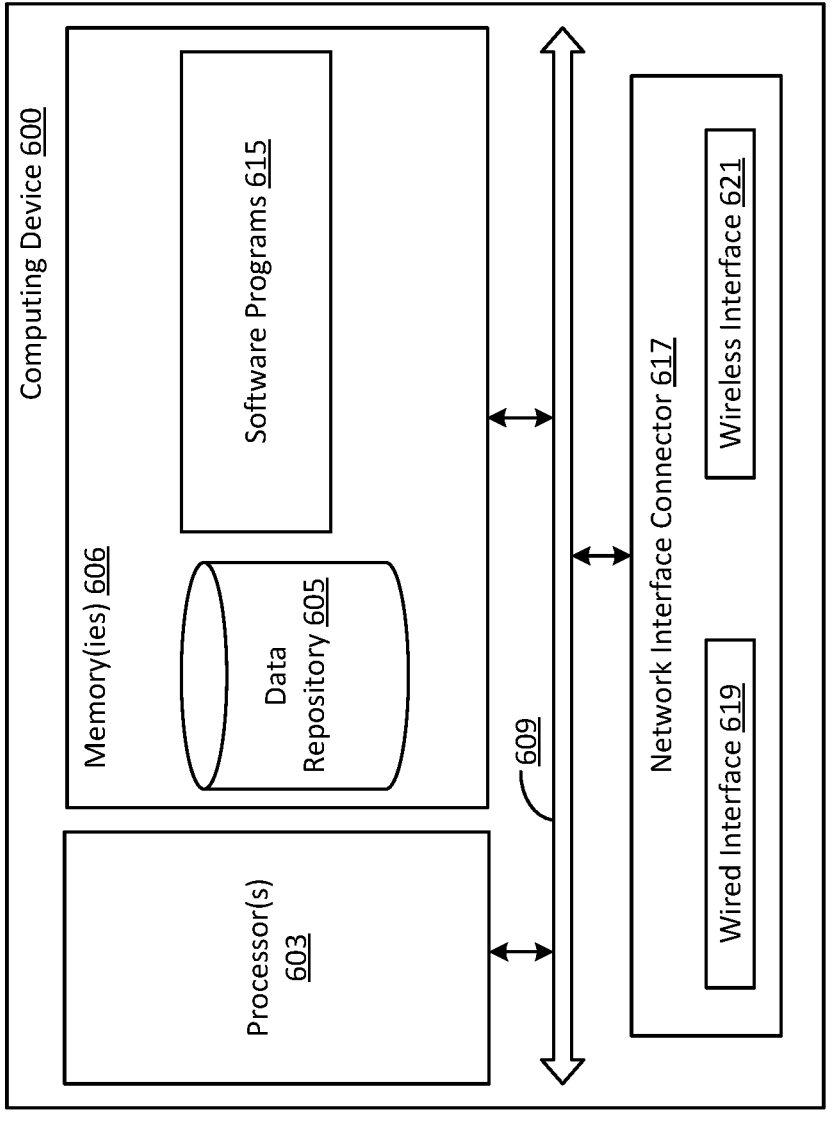
FIG. 6 is a block diagram of a computing device for implementing certain aspects of the present disclosure.

FIG. 6 is a block diagram of a computing device for implementing certain aspects of the present disclosure. FIG. 6 depicts exemplary computing device 600. Computing device 600 may represent hardware that executes the logic that drives the various system components described herein. For example, system components such as a credit account platform, a deposit platform, an attribute and income platform, a ML engine, a customer decisioning platform, an event streaming platform, a transaction decisioning platform, various database engines and database servers, and other computer applications and logic may include, and/or execute on, components and configurations like, or similar to, computing device 600.

Computing device 600 includes a processor 603 coupled to a memory 606. Memory 606 may include volatile memory and/or persistent memory. The processor 603 executes computer-executable program code stored in memory 606, such as software programs 615. Software programs 615 may include one or more of the logical steps disclosed herein as a programmatic instruction, which can be executed by processor 603. Memory 606 may also include data repository 605, which may be nonvolatile memory for data persistence. The processor 603 and the memory 606 may be coupled by a bus 609. In some examples, the bus 609 may also be coupled to one or more network interface connectors 617, such as wired network interface 619, and/or wireless network interface 621. Computing device 600 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at a transaction decisioning platform, a customer pre-approval notification;

receiving, at a memory of a transaction decisioning platform executed by one or more processors, a customer pre-approval notification, the memory comprising a data store;

aggregating, by the data store associated with a server executing instructions, data from more than one source;

performing, by the data store, extract, load, and transform (ELT) operations on the data;

persisting, by the data store, the operated data to a relational database;

publishing, by the data store, application programming interfaces ("APIs") for retrieval of the operated data;

streaming, by the data store to a distributed event streaming platform, a stream of transactions;

receiving, at the memory of the transaction decisioning platform and from the data store through one of the APIs, a stream of transactions, wherein the transactions are associated with a demand deposit account and the demand deposit account is associated with a customer;

publishing, by a deposit platform to the distributed event streaming platform, each transaction of the stream of transactions to in real time based on an association of the each transaction with an account of the customer and a payment product, the plurality of topics comprising a disqualification topic and a pre-approval topic, wherein the plurality of topics are each a partition of a partitioned commit log;

receiving, at the memory of the transaction decisioning platform and from the data store through one of the APIs, a total finance amount for the customer;

applying, by the transaction decisioning platform, a transaction eligibility rule to each transaction in the stream of transactions;

determining, by the transaction decisioning platform, based on application of the transaction eligibility rule, that one of the transactions from the stream of transactions is eligible for a credit product;

determining, by a machine learning engine of an attribute and income platform executed by one or more processors, a customer eligibility variable by processing a customer profile comprising whether the customer has an eligible direct deposit account, whether the direct deposit account has a threshold timeframe of regular inflow funding, and whether the direct deposit account has a threshold average balance;

determining, by the transaction decisioning platform, based on the customer eligibility variable, that the customer is eligible for the credit product within 300 ms, wherein the customer eligibility variable is continually updated based on the subscription to the disqualification topic and the pre-approval topic including the customer pre-approval notification, wherein the total finance amount for the customer is based on data reflecting the data in each topic, wherein the transaction decisioning platform subscribes to a customer pre-approval topic and receives the customer pre-approval notification via the customer pre-approval topic, wherein the transaction decisioning platform subscribes to a demand deposit account (DDA) transactions topic and receives the stream of transactions via the DDA transactions topic;

excluding, by the transaction decisioning platform, the one of the transactions from the stream of transactions on an eligible transaction list;

denying, by the transaction decisioning platform, the one of the transactions for execution; and triggering, by the transaction decision platform, a later decisioning cycle based on an account status change of the account.

2. The method of claim 1, wherein the transaction decisioning platform subscribes to a total finance amount topic and receives a total finance amount for the customer via the total finance amount topic.

3. A system comprising at least one computer including a processor, wherein the at least one computer is configured to:

receive, at a memory of a transaction decisioning platform executed by one or more processors, a customer pre-approval notification, the memory comprising a data store;

aggregate, by the data store associated with a server executing instructions, data from more than one source;

perform, by the data store, extract, load, and transform (ELT) operations on the data;

persist, by the data store, the operated data to a relational database;

publish, by the data store, application programming interfaces ("APIs") for retrieval of the operated data;

stream, by the data store to a distributed event streaming platform, a stream of transactions;

receive, at the memory of the transaction decisioning platform and from the data store through one of the APIs, a stream of transactions, wherein the transactions are associated with a demand deposit account and the demand deposit account is associated with a customer;

publish, by a deposit platform to the distributed event streaming platform, each transaction of the stream of transactions to in real time based on an association of the each transaction with an account of the customer and a payment product, the plurality of topics comprising a disqualification topic and a pre-approval topic, wherein the plurality of topics are each a partition of a partitioned commit log;

receive, at the memory of the transaction decisioning platform and from the data store through one of the APIs, a total finance amount for the customer;

apply, by the transaction decisioning platform, a transaction eligibility rule to each transaction in the stream of transactions;

determine, by the transaction decisioning platform, based on application of the transaction eligibility rule, that one of the transactions from the stream of transactions is eligible for a credit product;

determine, by a machine learning engine of an attribute and income platform executed by one or more processors, a customer eligibility variable by processing a customer profile comprising whether the customer has an eligible direct deposit account, whether the direct deposit account has a threshold timeframe of regular inflow funding, and whether the direct deposit account has a threshold average balance;

determine, by the transaction decisioning platform, based on the customer eligibility variable, that the customer is eligible for the credit product within 300 ms, wherein the customer eligibility variable is continually updated based on the subscription to the disqualification topic and the pre-approval topic including the customer pre-approval notification, wherein the total finance amount for the customer is based on data reflecting the data in each topic, wherein the transaction decisioning platform subscribes to a customer pre-approval topic and receives the customer pre-approval notification via the customer pre-approval topic, wherein the transaction decisioning platform subscribes to a demand deposit account (DDA) transactions topic, and receives the stream of transactions via the DDA transactions topic;

include, by the transaction decisioning platform, the one of the transactions from the stream of transactions on an eligible transaction list; and trigger, by the transaction decision platform, a later decisioning cycle based on an account status change of the account.

4. The system of claim 3, wherein the transaction decisioning platform subscribes to a total finance amount topic and receives a total finance amount for the customer via the total finance amount topic.

5. A non-transitory computer readable storage medium, including instructions stored thereon, which instructions, when read and executed by one or more computer processors, cause the one or more computer processors to perform steps comprising:

receiving, at a memory of a transaction decisioning platform executed by one or more processors, a customer pre-approval notification, the memory comprising a data store;

aggregating, by the data store associated with a server executing instructions, data from more than one source;

performing, by the data store, extract, load, and transform (ELT) operations on the data;

persisting, by the data store, the operated data to a relational database;

publishing, by the data store, application programming interfaces ("APIs") for retrieval of the operated data;

receiving, at the memory of the transaction decisioning platform and from the data store through one of the APIs, a stream of transactions, wherein the transactions are associated with a demand deposit account and the demand deposit account is associated with a customer;

publishing, by a deposit platform to the distributed event streaming platform, each transaction of the stream of transactions to a plurality of topics in real time based on an association of the each transaction with an account of the customer and a payment product, the plurality of topics comprising a disqualification topic and a pre-approval topic, wherein the plurality of topics are each a partition of a partitioned commit log;

receiving, at the memory of the transaction decisioning platform and from the data store through one of the APIs, a total finance amount for the customer;

applying, by the transaction decisioning platform, a transaction eligibility rule to each transaction in the stream of transactions;

determining, by the transaction decisioning platform, based on application of the transaction eligibility rule, that one of the transactions from the stream of transactions is eligible for a credit product;

determining, by a machine learning engine of an attribute and income platform executed by one or more processors, a customer eligibility variable by processing a customer profile comprising whether the customer has an eligible direct deposit account, whether the direct deposit account has a threshold timeframe of regular inflow funding, and whether the direct deposit account has a threshold average balance;

streaming, from an event streaming platform and by the transaction decisioning platform, determining, by the transaction decisioning platform, based on the customer eligibility variable, that the customer is eligible for the credit product within 300 ms, wherein the customer eligibility variable is continually updated based on the subscription to the disqualification topic and the pre-approval topic including the customer pre-approval notification, wherein the total finance amount for the customer is based on data reflecting the data in each topic, wherein the transaction decisioning platform subscribes to a customer pre-approval topic and receives the customer pre-approval notification via the customer pre-approval topic, wherein the transaction decisioning platform subscribes to a demand deposit account (DDA) transactions topic, and receives the stream of transactions via the DDA transactions topic; and including, by the transaction decisioning platform, the one of the transactions from the stream of transactions on an eligible transaction list; and trigger, by the transaction decision platform, a later decisioning cycle based on an account status change of the account.

6. The non-transitory computer readable storage medium of claim 5, wherein the transaction decisioning platform subscribes to a total finance amount topic and receives a total finance amount for the customer via the total finance amount topic.

* * * * *